(12) United States Patent
Perthou

(10) Patent No.: US 11,166,589 B2
(45) Date of Patent: Nov. 9, 2021

(54) BARBECUE GRILL

(71) Applicant: Peter M. Perthou, Gloucester, MA (US)

(72) Inventor: Peter M. Perthou, Gloucester, MA (US)

( * ) Notice: Subject to any disclaimer, the term of this patent is extended or adjusted under 35 U.S.C. 154(b) by 123 days.

(21) Appl. No.: 16/111,903

(22) Filed: Aug. 24, 2018

(65) Prior Publication Data

US 2019/0059649 A1    Feb. 28, 2019

Related U.S. Application Data

(60) Provisional application No. 62/550,104, filed on Aug. 25, 2017.

(51) Int. Cl.
*A47J 37/07* (2006.01)

(52) U.S. Cl.
CPC ....... *A47J 37/0704* (2013.01); *A47J 37/0763* (2013.01)

(58) Field of Classification Search
CPC .......................... A47J 37/0704; A47J 37/0763
See application file for complete search history.

(56) References Cited

U.S. PATENT DOCUMENTS

| 401,888 | A |  | 4/1889 | Keyser |  |
|---|---|---|---|---|---|
| 3,123,062 | A |  | 3/1964 | Psarris |  |
| 3,266,478 | A |  | 8/1966 | Booth |  |
| 3,413,935 | A | * | 12/1968 | Behrns | A47J 37/079 126/25 B |
| 3,903,866 | A | * | 9/1975 | Polinski | A47J 37/079 126/25 B |
| 3,938,494 | A | * | 2/1976 | Clark | A47J 37/0713 126/41 R |
| 4,592,334 | A |  | 6/1986 | Logan, Jr. |  |
| 4,777,927 | A |  | 10/1988 | Stephen et al. |  |
| 4,913,126 | A |  | 4/1990 | McCall |  |
| 5,086,752 | A |  | 2/1992 | Hait |  |
| 5,359,988 | A | * | 11/1994 | Hait | A47J 37/0704 126/153 |
| 5,687,704 | A | * | 11/1997 | Lerch | A47J 37/0763 126/25 R |
| 6,314,955 | B1 |  | 11/2001 | Boetcker |  |
| 6,488,023 | B2 | * | 12/2002 | Pecoskie | F24C 5/02 126/43 |
| 6,615,521 | B1 |  | 9/2003 | Lutz |  |
| 6,962,106 | B2 |  | 11/2005 | Viraldo |  |

(Continued)

FOREIGN PATENT DOCUMENTS

| CA | 1162123 | 2/1984 |
|---|---|---|
| KR | 10-1703059 | 2/2017 |

OTHER PUBLICATIONS

International Search Report and Written Opinion in corresponding Application No. PCT/US2018/047971, dated Dec. 13, 2018, pp. 1-16.

(Continued)

*Primary Examiner* — David J Laux
(74) *Attorney, Agent, or Firm* — Fish & Richardson P.C.

(57) ABSTRACT

Grilling apparatus includes an inner unit and an outer unit open at the top. There can be a grate intermediate the top and bottom of the inner cylinder. There can be a grill rack at the top of the outer cylinder.

21 Claims, 7 Drawing Sheets

(56) References Cited

U.S. PATENT DOCUMENTS

| | | | | |
|---|---|---|---|---|
| 8,028,689 B2* | 10/2011 | Bruno | ................... | A47J 37/079 |
| | | | | 126/25 B |
| 2006/0011192 A1 | 1/2006 | Citrynell et al. | | |
| 2012/0204852 A1* | 8/2012 | Boucher | ............. | A47J 37/0763 |
| | | | | 126/30 |
| 2017/0273505 A1* | 9/2017 | MacDonald | .............. | A23L 5/10 |

OTHER PUBLICATIONS

Extended European Search Report in corresponding EP Application No. 18848988.4, dated Jul. 29, 2020, pp. 1-7.

\* cited by examiner

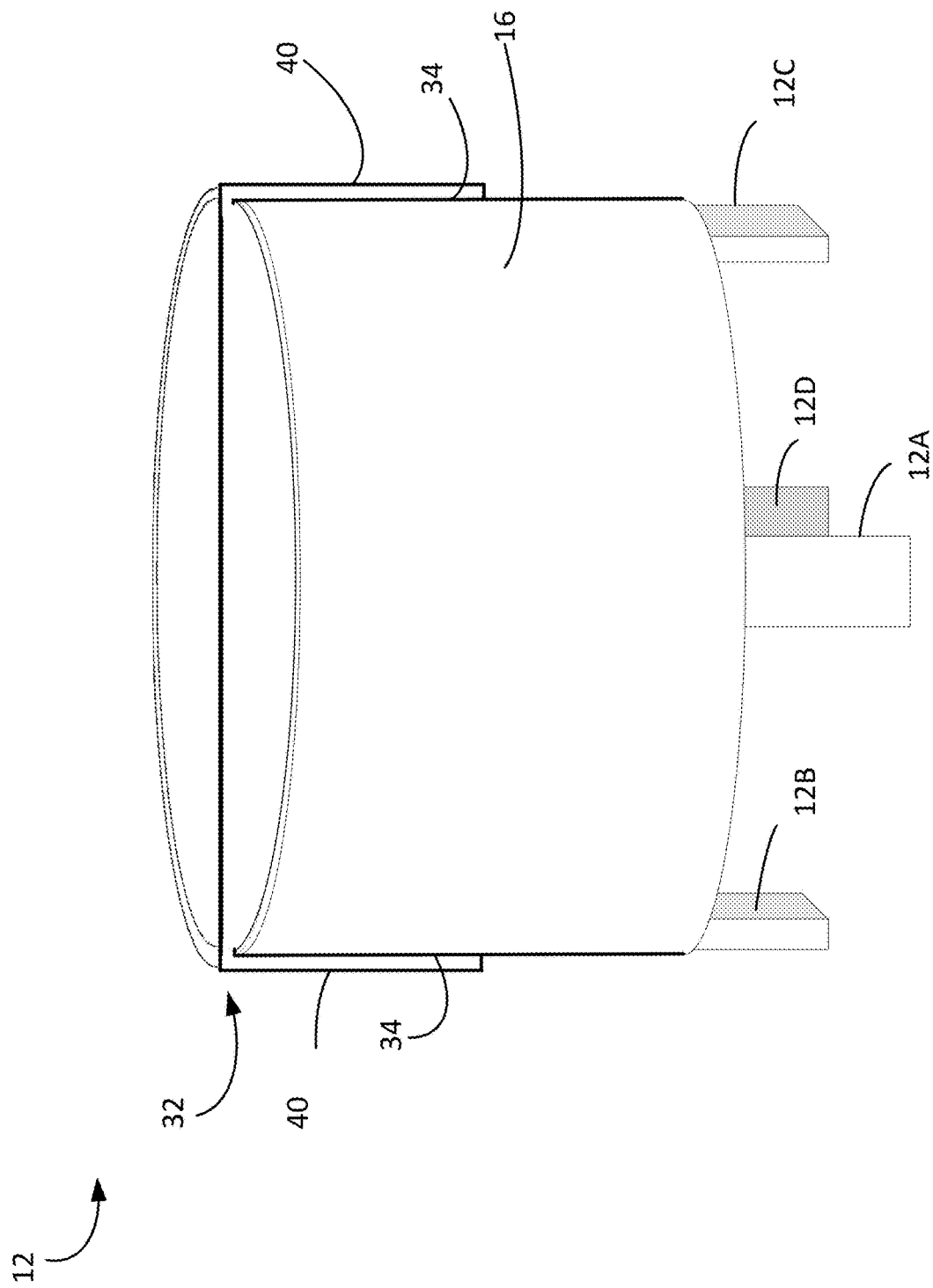

BARBECUE GRILL

RELATED APPLICATIONS

This application claims priority under 35 USC § 119(e) to provisional U.S. Patent Application 62/550,104, which was filed on Aug. 25, 2017, the entire contents of which are hereby incorporated by reference.

TECHNICAL FIELD

This specification relates in general to grilling, and more particularly to grilling with inner and outer grill units.

BACKGROUND

For background reference is made to U.S. Pat. Nos. 4,401,888, 4,913,126, 6,314,955 and 6,615,521, published application 2004/0000303 and the Barbecook Quick Start Barbeque.

SUMMARY

Some grills include a first unit (e.g., a cylinder) that has a horizontal grate and functions both as the firebox of the grill and as a charcoal starter. The first unit rests inside a second taller and wider unit (e.g., another cylinder) forming two concentric chimneys. The larger unit has ventilation holes around the base. A grill rack rests across the top of the taller outer unit, and both units rest on a metal disk larger than the outer unit.

Some grills include an outer unit having an open top and an open bottom, an inner unit having an open top, an open bottom, and a grate between the open top of the inner unit and the open bottom of the inner unit. The inner unit can be positioned within the outer unit. Some grills include a cover with a base that is larger than the perimeter of the outer unit.

Some grills include an outer cylinder having an open top and a bottom, an inner cylinder having an open top, an open bottom, and a grate between the open top of the inner cylinder and the open bottom of the inner cylinder. The inner cylinder can be disposed within the outer cylinder. Some grills include a cover without vent holes that has a base with a circumference that is larger than a circumference of the outer cylinder such that the cover and the outer cylinder define a gap of between 1 and 3 inches when the cover is in place on the outer cylinder in use.

Some grills include an outer cylinder having an open top and a bottom, an inner cylinder having an open top, an open bottom, and a grate between the open top of the inner cylinder and the open bottom of the inner cylinder, the inner cylinder disposable within the outer cylinder; and a cover; wherein the inner cylinder is laterally moveable within the outer cylinder.

Embodiments of these grills can include one or more of the following features.

In some embodiments, the inner unit includes an inner cylinder and the outer unit includes an outer cylinder.

In some embodiments, the cover and the outer cylinder define a gap of between 1 and 3 inches when the cover is in place on the outer cylinder during use. In some cases, the cover does not have adjustable vent holes.

In some embodiments, the inner cylinder is laterally moveable within the outer cylinder.

In some embodiments, a distance between the open top and the bottom of the outer cylinder is greater than a distance between the open top and the open bottom of the inner cylinder.

In some embodiments, walls of the outer cylinder around the bottom of the outer cylinder define holes extending through the walls of the outer cylinder. In some cases, the outer cylinder includes handles on an outer surface.

In some embodiments, the inner cylinder includes a plurality of legs attached to an inner surface of the inner cylinder, the plurality of legs configured to support a removable grate.

In some embodiments, the inner cylinder is constructed and arranged as a firebox.

In some embodiments, the inner cylinder is constructed and arranged to act as a fire starter.

In some embodiments, the grill includes a partition defining slots sized to receive a wall of the inner unit.

Other features, objects and advantages of the grill will become apparent from the following detailed description when read in connection with the accompanying drawings.

DESCRIPTION OF DRAWINGS

FIG. 7 is a perspective view of the partition in FIG. 6 installed in the inner unit of FIG. 2.

Like reference symbols in the various drawings indicate like elements.

DETAILED DESCRIPTION

This specification describes grills that include an outer unit and an inner unit. The outer unit supports a rack on which food can be cooked. The inner unit can be used to direct heat to an area on the rack. The inner unit can be positioned within the outer unit. The inner unit and the outer unit are laterally movable relative to each other. The inner unit can be used to contain fuel (e.g., charcoal or wood). The inner unit directs intense heat to an area of the rack directly above the inner unit. Some grills also include a cover. The cover can be used to cover the rack on the outer unit and retain hot air in the grill.

Figure 1:
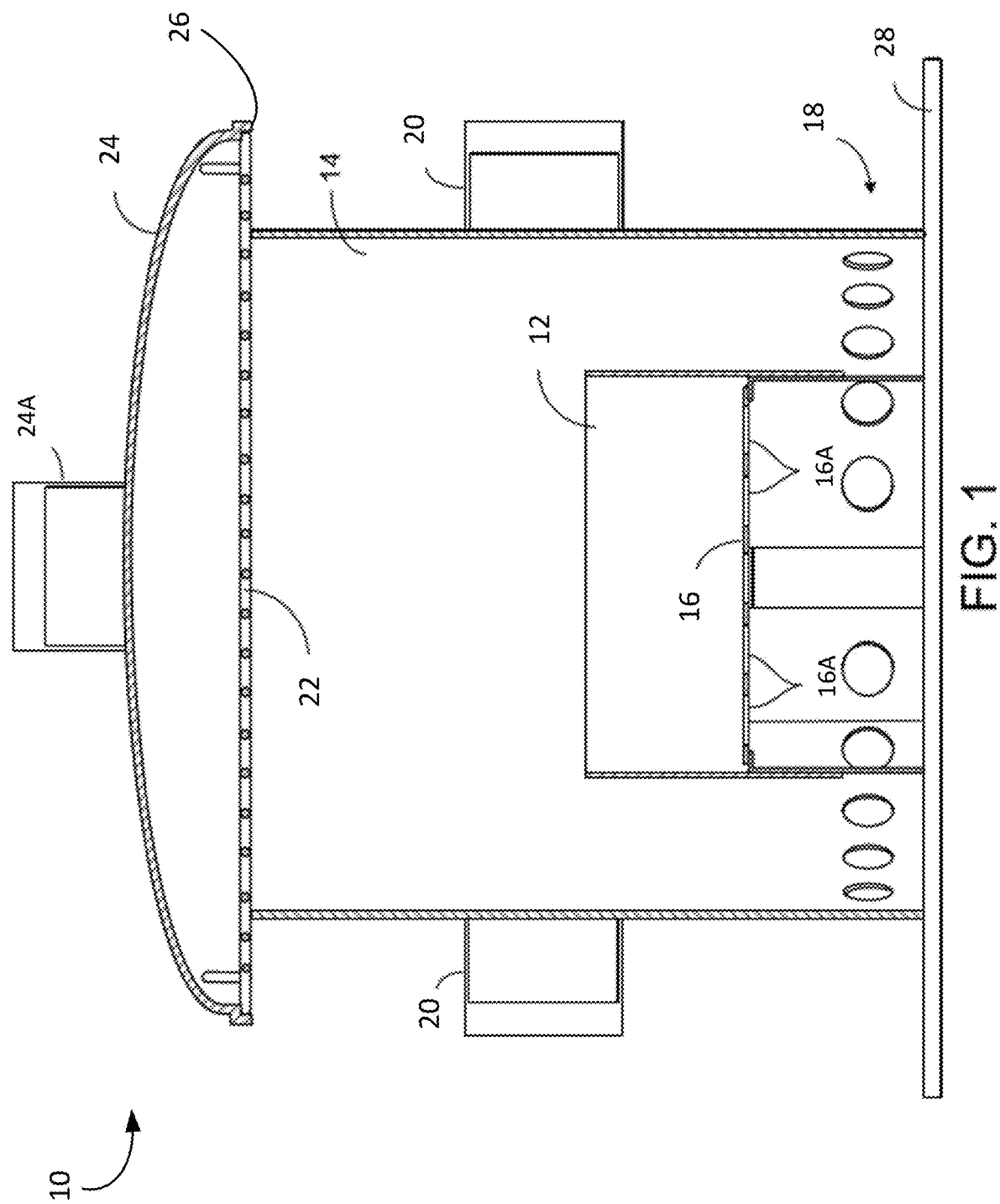
FIG. 1 is a vertical sectional view of a grill.

FIG. 1 shows a grill 10 that includes a hollow inner unit 12 and an outer unit 14. The inner unit 12 is open at both top and bottom and includes a grate 16 with holes 16A. The grate 16 separates the space within the inner unit 12 into a top section and a bottom section. The top section can be used to hold fuel that burns relatively slowly (e.g., charcoal or wood). The bottom section can be used to hold substances that burn relatively quickly (e.g., crumpled newspaper or kindling). The outer unit 14 is open at top and includes ventilation holes 18 around the circumference of its base. The outer unit 14 has handles 20 along opposite points midway along the outside. The handles 20 aid in moving the outer unit 14. A grill rack 22 rests on the outer unit 14 and is covered by a domed cover 24 having a handle 24A. The cover 24 has a base 26 having a perimeter that is larger than a perimeter of the outer unit 14. The grill 10 rests on a steel plate 28. In some grills, the plate and the outer unit are attached. The grill components are preferably formed from stainless steel.

In the illustrated grill 10, the inner unit 12, and the outer unit 14 are both cylinders and the cover 24 has a circular base 26. In some grills, the inner unit and the outer unit have non-cylindrical configurations. For example, some grills may have inner and outer units that are cubes. Additionally, the inner unit and outer unit may be different structures, for example, the inner unit may be a cylinder and the outer unit may be a cube. The distance between the open top and the bottom of the outer cylinder 14 is greater than a distance between the open top and the open bottom of the inner cylinder 12. When on the same surface (e.g., the plate 28) the outer cylinder 14 is taller than the inner cylinder 12. In the grill 10, the distance between the open top and the bottom of the outer cylinder 14 is about 17 inches and the distance between the open top and the open bottom of the inner unit 12 is about 8.5 inches. Some grills have other dimensions.

Figure 2:
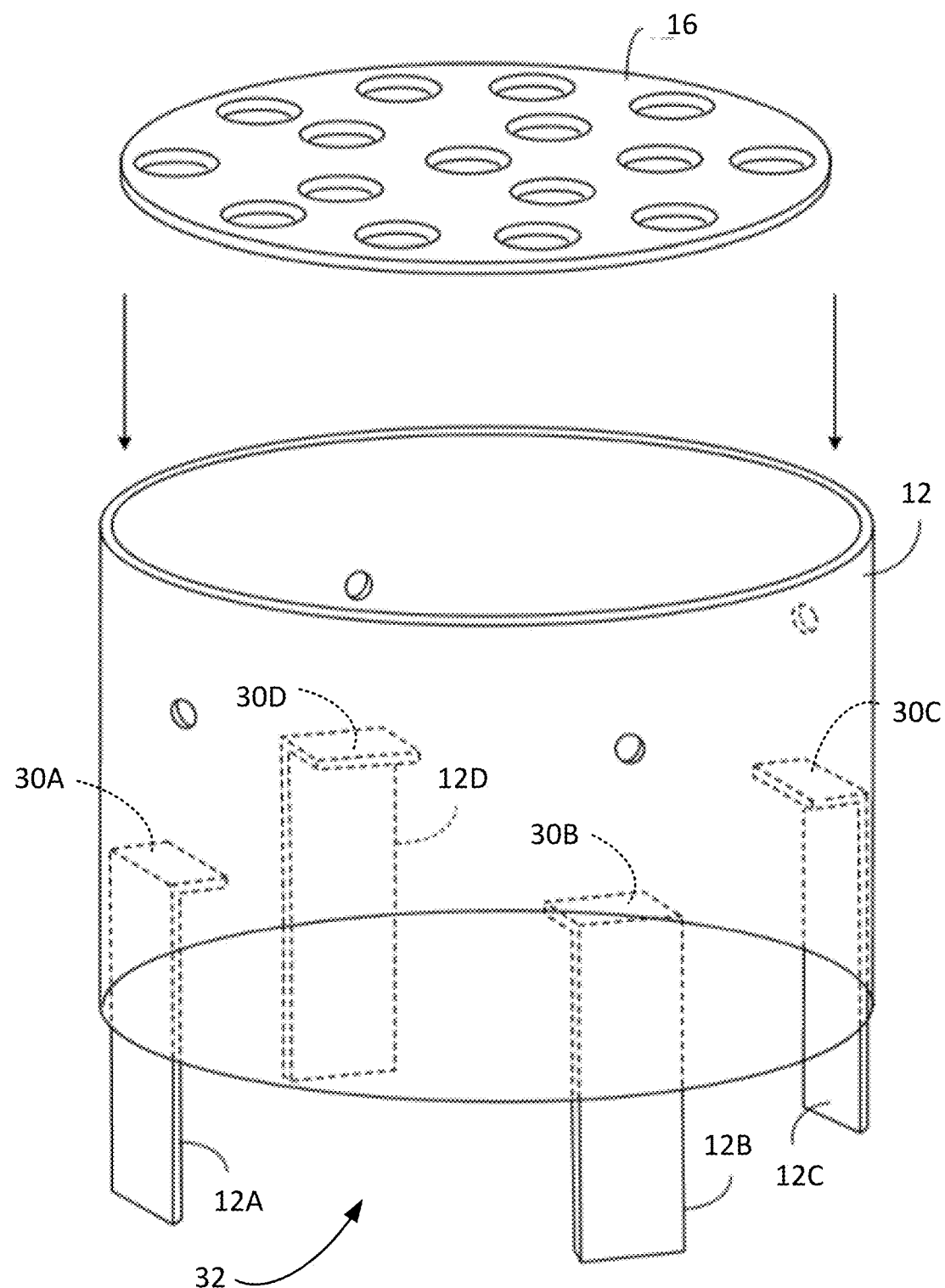
FIG. 2 is an exploded view of the grate and inner unit.

FIG. 2 is an exploded view showing grate 16 above inner cylinder 12. Inner unit 12 has four legs 12A, 12B, 12C and 12D. The legs 12A, 12B, 12C, 12D extend vertically. Each leg 12A, 12B, 12C 12D has laterally extending ledges 30A, 30B, 30C, 30D. In the inner unit 12, the ledges 30A, 30B, 30C, 30D are 1½ inches long. The ledges 30A, 30B, 30C, 30D holds the grate 16 of the inner unit 12 above the surface supporting the inner unit 12. A space 32 is created between ends of the legs 12A, 12B, 12C, 12D and the bottom of the inner unit 12.

FIG. 2 also shows the grate 16 of the inner unit 12. Prior to use, a user inserts the grate 16 into the open end of the inner unit. The grate 16 moves further into the inner unit 12 until it abuts the ledges 30A, 30B, 30C, 30D of the legs 12A, 12B, 12C, 12D. In the inner unit 12 shown in FIG. 2, the legs are attached to walls of the inner unit 12 and the grate 16 translates relative to the inner unit 12. In some grills, the grate is also attached to the walls of the inner unit.

The inner unit 12 is constructed and arranged as a firebox. The inner unit can also be used as a fire starter. However, the configuration of the inner unit 12 reflects that it is primarily a firebox. The inner unit 12 is shorter and wider than chimney starters used to start light charcoal before pouring the charcoal into a separate grill. In addition, charcoal or other fuel remains in the inner unit 12 rather than being poured into a separate grill so the inner unit 12 does not need handles.

The outer unit 14 protects the firebox inside the inner unit 12 from wind and also acts as a second chimney which increases the flow of air through the firebox. The inner unit 12 firebox creates an intense and focused column of heat so that two cooking zones are formed on the grill rack 22 above. One very hot zone is directly above the firebox with the same diameter as the firebox and a less intense cooking zone in the annular space on the grill rack 22 is directly above the space between the inner and outer units 12, 14. For high heat, food can be cooked directly above the inner unit 12. For lower heat, food can be moved on the grill rack 22 to the zone between the outer and inner units 12, 14. The dual cooking zones eliminate the need for a mechanism to raise or lower the grill rack to control heat intensity on food as the position of the food on the grate can be used to control heat intensity on food.

The inner unit 12 and the outer unit 14 are laterally moveable relative to each other. As previously described, the firebox can be centered directly under the grill rack to cook at high intensity heat, for example with a domed cover. This approach has been found to be effective, for example, to cook pizza that requires high intensity heat between 600 and 800° Fahrenheit. The firebox can also be positioned against the outer cylinder to create a large area of indirect heat for slower and longer grilling times. A domed cover 22 with no vents in the dome may be used. Both cylinders rest on the steel disc 28 that has a circumference greater than that of the outer unit 14.

Figure 3:
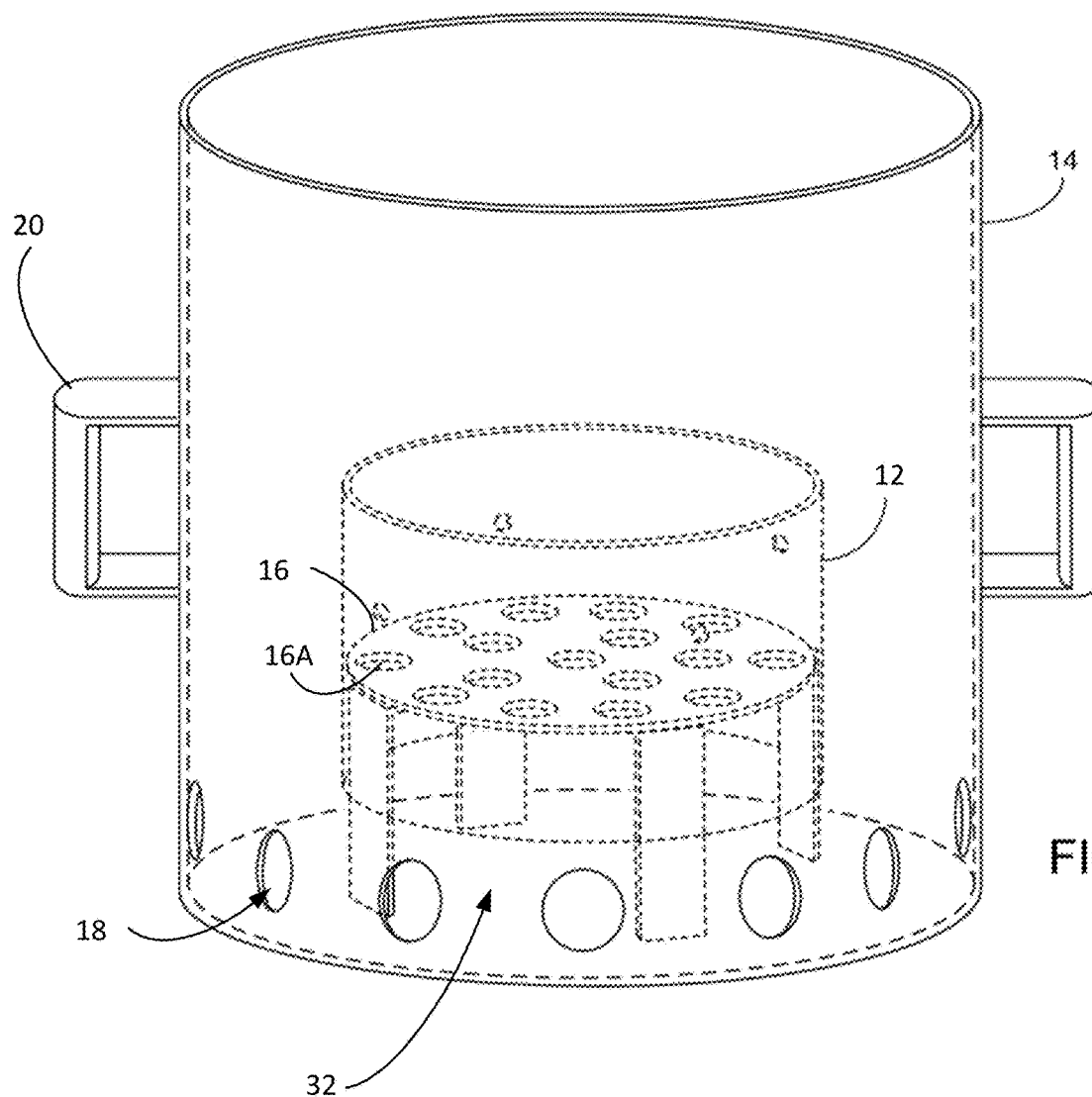
FIG. 3 is a view showing the inner unit inside the outer unit.

FIG. 3 illustrates the inner unit 12 positioned inside the outer unit 14. The inner unit 12 and the outer 14 can be moved relative to each other. For example, the outer unit 14 can be moved using the handles 20 and/or the inner unit can be placed in a desired position before lighting the grill. FIG. 3 also shows the ventilation holes 18 at the bottom of the outer unit 14. The holes 18 provide access to the lower section of the inner unit. The holes 18 in outer unit 14 are 1½ inches in diameter. Some grills have ventilation holes that are between 1 and 2 inches in diameter. The ventilation holes 18 are spaced equidistantly around the outer unit 12. In some outer units 12, the holes have irregular spacing and/or differing diameters. The holes 18 can be die cut.

A user can start the grill by setting fire to the quick burning material (e.g. crumpled paper or kindling) placed in the lower section of the inner unit 12. For example, the user can extend a lighter through one of the holes 18 and through the space 32 between two of the legs 12A, 12B, 12C, 12D to the lower section of the inner unit 12. The fire ignites the fuel (e.g., charcoal or wood) in the upper section of the inner unit 12 through the holes 12A in the grate. As the fuel burns, the air heats and rises. Rising hot air pulls in more air through the ventilation holes 18. The space 32 acts as a vent that allows air entering from the circular holes 18 on the outer cylinder 14 into the inner unit 12. The air from the ventilation holes 18 is heated in the inner unit 12 and rises in a column towards the rack 22 (see FIG. 1). The air flowing through the inner unit 12 creates intense, focused heat directed to a portion of the grill rack 22 immediately above the grate 12.

Figure 4:
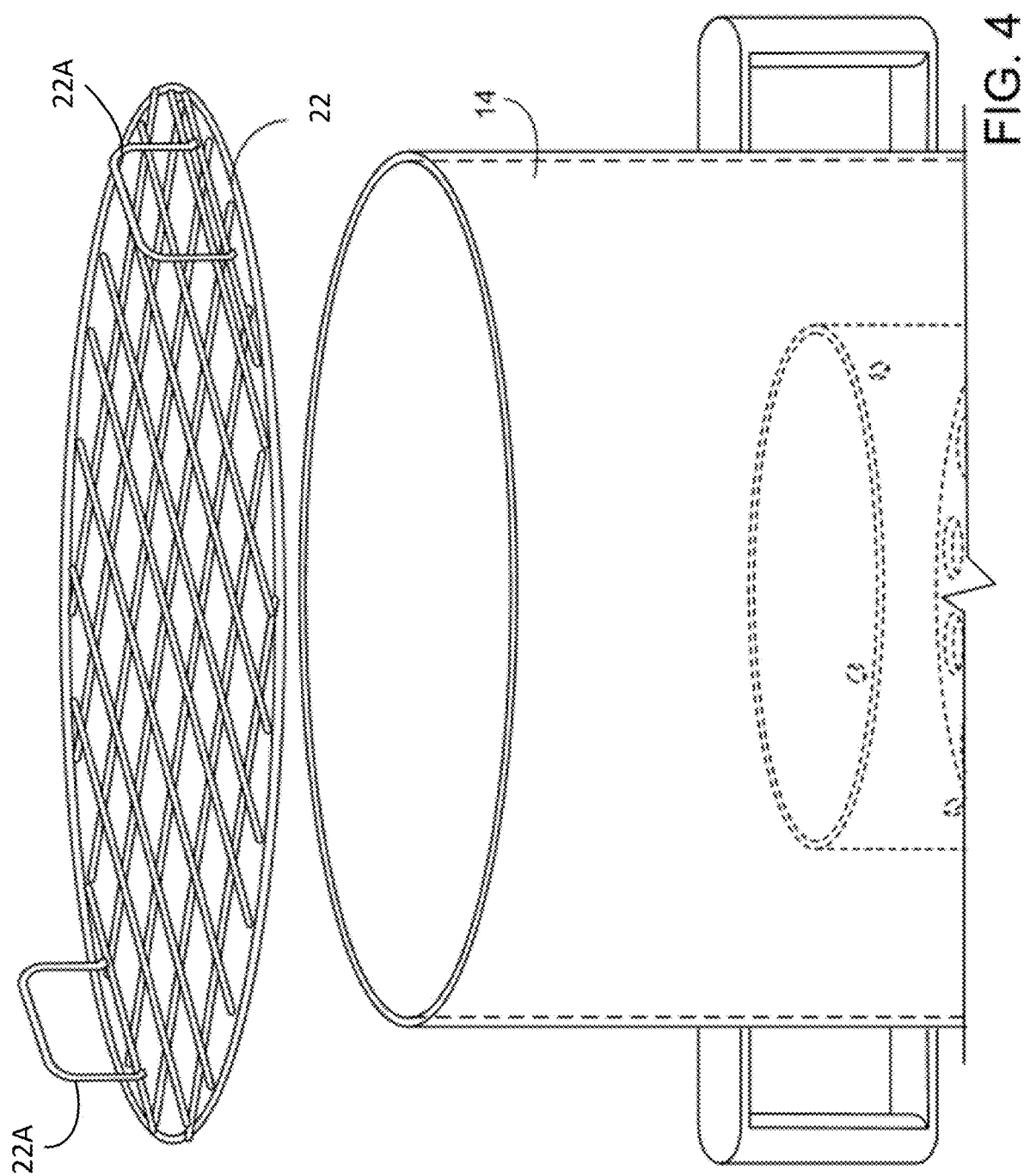
FIG. 4 is an exploded view of the grill rack above the outer unit.

FIG. 4 is an exploded view illustrating the grill rack 22 seated on outer unit 14. The grill rack 22 is made of stainless steel. Some grill racks are made of different metals. The grill rack 22 also includes handles 22A for repositioning the rack 22 on the outer unit 14. The rack 22 has a crosshatch pattern. Other grill racks may have a different pattern, for example, parallel lines or mesh.

Figure 5:
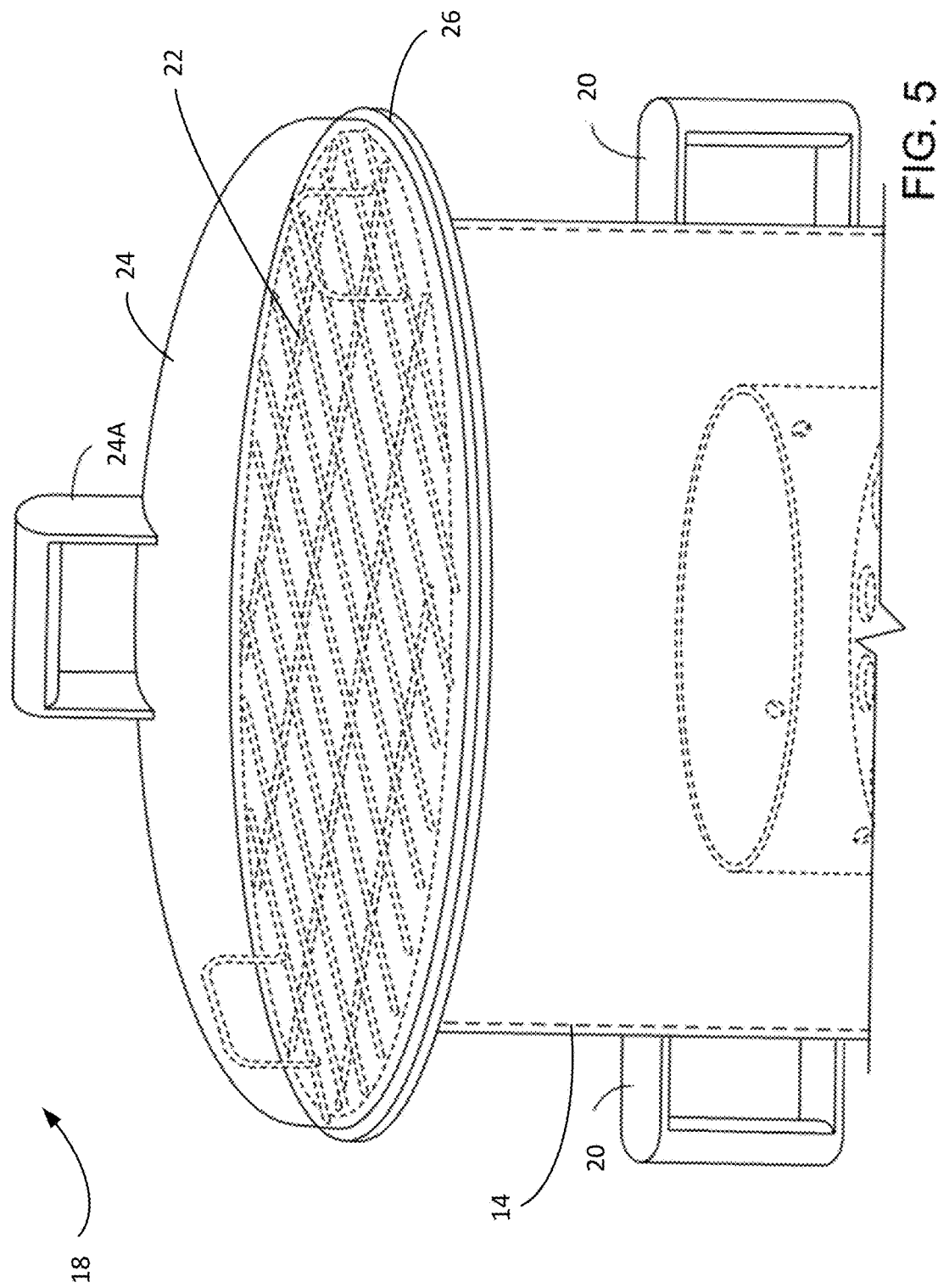
FIG. 5 is a perspective view of a cover above the outer unit.

FIG. 5 shows the grill rack 22 seated on the outer unit 14 with handles 20 attached to the outer cylinder. The cover 24 is shaped to cover the entirety of the rack 22. Some grills 10 have covers that only cover a part of the grill. The cover 24 is solid and does not have ventilation holes. Some covers have ventilation holes. The base 26 of the cover 24 has a diameter of 23.5 inches and the outer unit has a diameter of 17 inches. The different diameters allow the cover to rest on the grill rack 22. The cover 22 and the outer cylinder 14 define an annular gap of about 2.25 inches between the cover 22 and the outer cylinder 14. The annular gap provides a route that allows grilling byproducts (e.g., the polycyclic aromatic hydrocarbons formed when fat drips from the meat onto the flame) to easily escape the grill rather than becoming attached to the food being cooked.

The components of some grills are sized such that the annular gap between the cover and the outer cylinder is between 1 and 3 inches when the cover is in place on the outer cylinder. The ventilation holes 18 (see FIG. 1) in the outer unit 14 and the gap between the cover 22 and the outer cylinder 14 enables the use of covers that do not have adjustable vent holes, as the annular gap acts as a vent.

Figure 6:
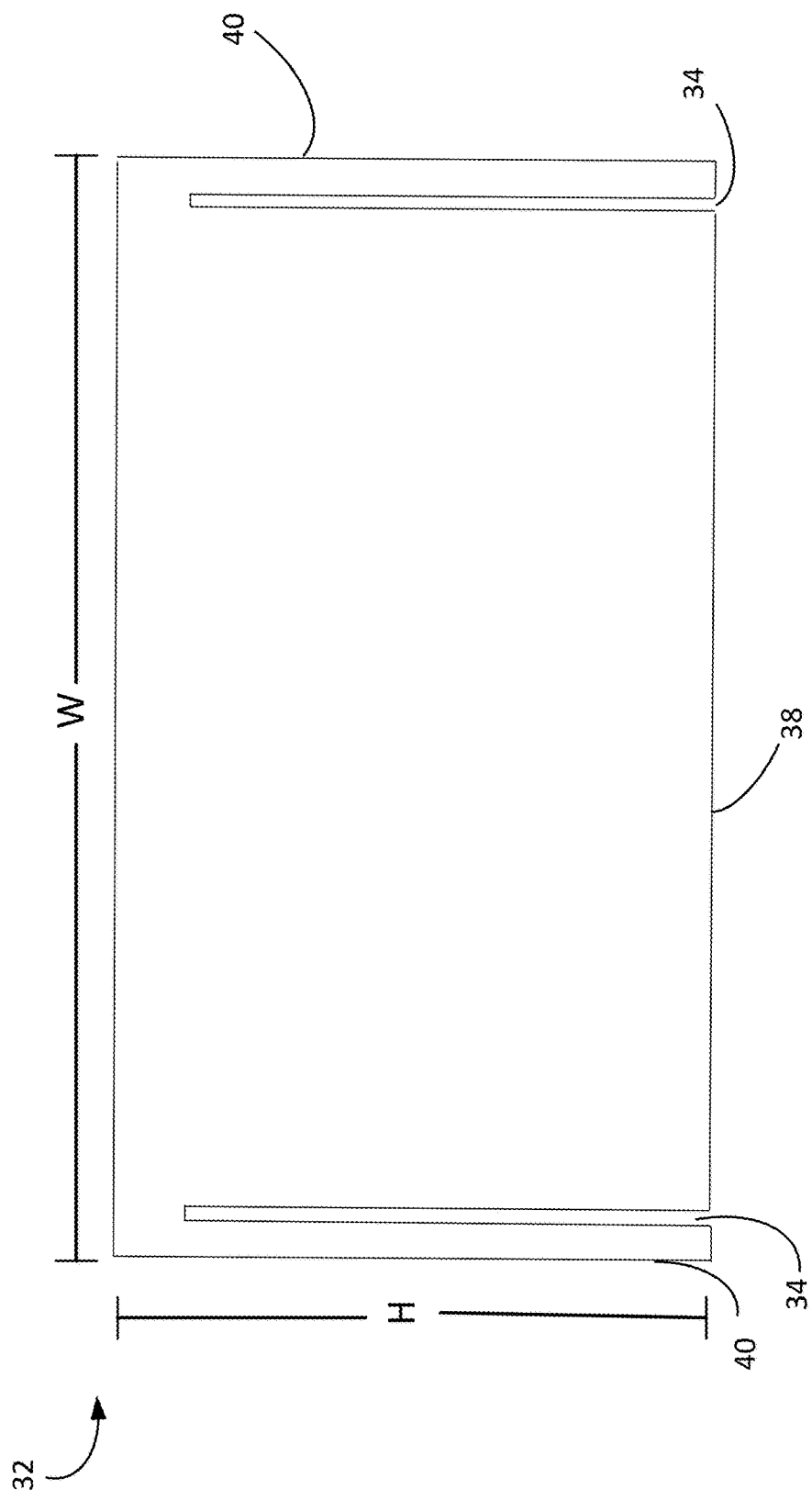
FIG. 6 is a side view of a partition.

FIG. 6 is a side view of a partition 32. The partition 32 can be placed on the inner unit 12 (see FIG. 1) to divide the upper portion of the inner unit 12. The partition 32 has a width W of 11 inches and a height H of 6 inches. The partition 32 defines slots 34 sized to receive the wall of the inner unit 12. The slots 34 begin at a first side 38 of the partition and extend though the partition 32, parallel to each other. In the partition 32, the slots 34 are 0.125 inches wide and 5.25 inches long and are positioned 0.375 inches from the sidewalls 40 of the partition 32. The slots 32 are spaced to receive the inner unit 12 at the diameter of the inner unit 12. The diameter of the inner unit is 10 inches and the slots 32 are spaced 10 inches apart. In some grills, the slots are spaced closer together to receive the inner unit at a segment that is not the diameter or to receive an inner unit smaller than 10 inches.

Some grills have partitions with different dimensions. For example, the partition may be taller than 6 inches, wider than 11 inches, or both wider than 6 inches and taller than 11 inches. Some grills have partitions that are may be shorter than 6 inches, thinner than 11 inches, or both shorter than 6 inches and thinner than 11 inches. In some grills, the partitions may be received by tracks in the cavity of the inner unit. In such a grill, the partition may not have slots.

FIG. 7 is a perspective view of the partition 32 in FIG. 6 placed on the inner unit 16 with the slots 34 receiving the wall of the inner unit 12. The slots 34 extend from the top of the inner unit 12 to the grate 16 (see FIG. 3). A part of the partition 32 extends out of the inner unit 12. In the grill 10 of FIG. 7, 0.75 inches of the partition 32 extends out of the inner unit 12.

The partition 32 divides the upper portion of the inner unit 12 into a first sector and a second sector. This configuration can be used to separate the fuel held in the upper section of the inner unit 12 (see FIG. 1). For example, fuel can be placed in the first sector and not in the second sector to reduce the area of the rack 22 that receives intense heat.

In another approach, the partition 32 can be used to create three zones of heat. For example, more fuel can be placed in the first sector in the inner unit 12 than in the second sector of the inner unit 12 (see FIG. 1). The rack 22 will have an intensely hot area directly over the first sector, a hot area directly over the second sector, and a warm area above the annular space between the inner unit 12 and the outer unit 14 (see FIG. 1). In some grills, a plurality of partitions can be inserted into the inner unit. Such partitions can be sized so that the partition engages the inner unit at width that is smaller than the diameter.

This specification describes a grill and grilling techniques, which have a number of advantages. Those skilled in the art may make numerous uses and modifications of and departure from the specific apparatus and techniques described without departing from the inventive concepts.

A number of embodiments of the invention have been described. Nevertheless, it will be understood that various modifications may be made without departing from the spirit and scope of this disclosure. For example, the concentric structure described can also be used with a gas grill. Accordingly, other embodiments are within the scope of the following claims.

What is claimed is:

1. A grilling apparatus comprising:
an outer unit having an open top and a bottom,
an inner unit having an open top, an open bottom, and a grate between the open top of the inner unit and the open bottom of the inner unit, the inner unit disposed within the outer unit; and
a cover with a base having a circumference that is larger than a circumference of the outer unit;
wherein the inner unit comprises an inner cylinder and the outer unit comprises an outer cylinder; and
wherein the base of the cover and the top of the outer unit define a gap of between 1 and 3 inches when the cover is in place on the outer cylinder in use.

2. The grilling apparatus of claim 1, wherein the cover does not have adjustable vent holes.

3. The grilling apparatus of claim 2, wherein the inner cylinder is laterally moveable within the outer cylinder.

4. The grilling apparatus of claim 1, wherein a distance between the open top and the bottom of the outer cylinder is greater than a distance between the open top and the open bottom of the inner cylinder.

5. The grilling apparatus of claim 1, wherein walls of the outer cylinder around the bottom of the outer cylinder define holes extending through the walls of the outer cylinder.

6. The grilling apparatus of claim 5, wherein the outer cylinder comprises handles on an outer surface.

7. The grilling apparatus of claim 1, wherein the inner cylinder includes a plurality of legs attached to an inner surface of the inner cylinder, the plurality of legs configured to support a removable grate.

8. The grilling apparatus of claim 1, wherein the inner cylinder is constructed and arranged as a firebox.

9. The grilling apparatus of claim 8, wherein the inner cylinder is constructed and arranged to act as a fire starter.

10. The grilling apparatus of claim 1, further comprising a partition defining a first slot, and a second slot that extend partially though the partition from a first side;
wherein the slots are configured to receive a wall of the inner unit.

11. A grilling apparatus comprising:
an outer cylinder having an open top and bottom,
an inner cylinder having an open top, an open bottom, and a grate between the open top of the inner cylinder and the open bottom of the inner cylinder, the inner cylinder disposed within the outer cylinder; and
a cover without vent holes that has a base with a circumference that is larger than a circumference of the outer cylinder such that the base of the cover and the top of the outer cylinder define a gap of between 1 and 3 inches when the cover is in place on the outer cylinder in use.

12. The grilling apparatus of claim 11, wherein the inner cylinder is laterally moveable within the outer cylinder.

13. The grilling apparatus of claim 11, wherein a distance between the open top and the bottom of the outer cylinder is greater than a distance between the open top and the open bottom of the inner cylinder.

14. The grilling apparatus of claim 11, wherein walls of the outer cylinder around the bottom of the outer cylinder define holes extending through the walls of the outer cylinder.

15. The grilling apparatus of claim 11, wherein the inner cylinder includes a plurality of legs attached to an inner surface of the inner cylinder, the plurality of legs configured to support a removable grate.

16. The grilling apparatus of claim 11, further comprising a partition defining a first slot, and a second slot that extend partially though the partition from a first side;
wherein the slots are configured to receive a wall of the inner cylinder.

17. A grilling apparatus comprising:
an outer cylinder having an open top and bottom,
an inner cylinder having an open top, an open bottom, and a grate between the open top of the inner cylinder and the open bottom of the inner cylinder, the inner cylinder disposable within the outer cylinder; and
a cover;

wherein the inner cylinder is laterally moveable within the outer cylinder; and wherein the cover has a base with a circumference that is larger than a circumference of the outer cylinder and the base of the cover and the top of the outer cylinder define a gap of between 1 and 3 inches when the cover is in place on the outer cylinder in use.

18. The grilling apparatus of claim 17, wherein the cover does not have adjustable vent holes.

19. The grilling apparatus of claim 18, wherein walls of the outer cylinder around the bottom of the outer cylinder define holes extending through the walls of the outer cylinder.

20. The grilling apparatus of claim 17, further comprising a partition defining a first slot, and a second slot that extend partially though the partition from a first side;

wherein the slots are configured to receive a wall of the inner cylinder.

21. A grilling apparatus comprising:

a cylindrical outer unit having an open top and a bottom, a cylindrical inner unit having an open top, an open bottom, and a grate between the open top of the inner unit and the open bottom of the inner unit, the inner unit disposed within the outer unit; and a cover without adjustable vent holes, the cover having a base with a circumference that is larger than a circumference of the outer unit such that the base of the cover and the top of the outer unit define a gap of between 1 and 3 inches when the cover is in place on the outer cylinder in use.

\* \* \* \* \*